Patented Oct. 21, 1941

2,259,468

UNITED STATES PATENT OFFICE 2,259,468

PORCELANIC BONDED DIAMOND ABRASIVE

Henry R. Houchins, Niagara Falls, N. Y., assignor to The Carborundum Company, Niagara Falls, N. Y., a corporation of Delaware No Drawing. Application February 2, 1939, Serial No. 254,254

7 Claims. (Cl. 51—308)

This invention relates to diamond abrasive articles and particularly to ceramically bonded diamond abrasive articles and the manufacture thereof.

This invention has among its objects the provision of an abrasive article containing diamond abrasive which is economical to make and use and in which the diamond abrasive is firmly bonded but so held as to permit rapid and efficient abrasion.

Diamond abrasives present certain problems in the manufacture of abrasive articles not encountered with other abrasives. Being harder than other known materials their potential abrading life is longer; being much more expensive than other known abrasives, for the sake of economy they must be utilized to the best advantage and consequently, must be so used as to take advantage of their long potential abrading life. It is evident, therefore, that any bond that can advantageously be used for the bonding of diamond abrasive must hold the diamond particles in place until they have become dulled by use. Accomplishing this, however, is difficult because the surfaces of the diamond particles are not readily wettable and in general firm bonding is obtained only by wetting or reaction.

In my copending application Serial No. 254,231 filed February 2, 1939, I have disclosed the use of ceramic bonds and in particular, glass bonds for a manufacture of diamond abrasive articles. The present application, which like application Serial No. 254,231 is a continuation in part of application Serial No. 170,860, filed October 25, 1937, relates to another type of ceramic bond, a porcelanic bond.

So-called porcelanic bonds have previously been used in the production of abrasive articles but these have been, almost entirely, bonds containing very high percentages of fluxes so that their behavior during firing has resembled the behavior of glass bonds in that there is some loss of shape due to slumping. While these so-called porcelanic bonds can be used for the bonding of diamond abrasives, I have discovered that true porcelanic bonds in which only part of the bond goes to the vitreous state upon maturation, with consequent lack of flow at the maturing temperature, produce outstandingly improved results in the bonding of diamond abrasives. It is the true porcelanic bonds of the type above mentioned which are meant when, in this specification and the accompanying claims, the terms "porcelanic bond" or "porcelanic composition" are used.

The following examples set out typical porcelanic compositions which I have found suitable for the bonding of diamonds:

*Example I*

| | Per cent |
|---|---|
| Feldspar | 40 |
| Ball clay | 30 |
| Kaolin | 20 |
| Flint | 10 |

*Example II*

| | Per cent |
|---|---|
| Feldspar | 30 |
| Ball clay | 30 |
| Kaolin | 20 |
| Flint | 20 |

Porcelains and earthenware are made by burning mixtures containing three main functional constituents — a plastic ingredient, an inert filler, and a flux. In the foregoing examples the ball clay and kaolin are plastic ingredients, the flint is an inert filler and the feldspar is a flux. Other materials may in some instances be used in place of those named although the named substances are the common ingredients of a porcelanic composition. If proper account is taken of the difference in functional properties of other substances, if such are substituted, satisfactory bonds according to my invention may be made with the functional constituents within the following limits:

| | Per cent |
|---|---|
| Plastic ingredient | About 30 to about 70 |
| Inert filler | 0 to about 40 |
| Flux | About 20 to about 50 |

In the production of diamond abrasive articles with such porcelanic compositions as bonds the following proportions will be found to produce satisfactory results:

*Example III*

| | Per cent |
|---|---|
| Diamond abrasive (80 to 220 mesh) | 9 |
| Porcelanic composition | 91 |

*Example IV*

| | Per cent |
|---|---|
| Diamond abrasive (100 to 180 mesh) | 15 |
| Porcelanic composition | 85 |

It will be readily recognized that other proportions of diamond and bond may be used besides those specifically set forth above although for most uses a greater proportion of diamond abrasive than 15% is not commercially feasible. The grit size of the abrasive may also of course be varied in accordance with the abrasive characteristics desired in the article being made. Fillers or secondary abrasive may also be employed if desired.

The abrasive compositions such as those set forth in Examples III and IV are formed into abrasive articles such as grinding wheels or the like by molding or forming the mixture of abrasive and bond, after addition of sufficient plasticizing liquid, such as water, in any of the suitable well-known ways, such as pressing, tamping, extruding and the like. The molded articles are then removed to a suitable furnace and burned or matured at high temperatures to form extremely hard dense abrasive articles.

This burning or maturing must be performed without deleteriously affecting the diamonds and I accomplish this by burning the articles in a reducing or in a non-oxidizing atmosphere. A reducing or non-oxidizing atmosphere may be provided in any of several ways, but I have found that a convenient way to produce satisfactory results is to place the articles in a box, crucible, or sagger of carbon and provide it with a carbon lid. The atmosphere existing in such a container at the high temperature used will be found sufficiently reducing or at least non-oxidizing to prevent graphitization or oxidation of the diamond particles.

With the bonds of the type disclosed and claimed in this application I am able to secure extremely good results because of the ease with which the porosity and hardness of the bond may be controlled. Varying the temperature of burning or maturation results in the production of articles having different degrees of porosity. An increase in the burning temperature within the comparatively long range possible with such compositions results in progressively decreasing porosity so that by suitable regulation of the burning or maturing temperature abrasive articles having a wide range of porosities may be obtained and as will be evident the hardness of the resultant articles will also vary. Thus an abrasive article using the procelanic bond composition of Example I and the proportion of abrasive of Example III when pressed at 2000 lbs. per sq. inch and then burned at 1250° C. will produce an extremely hard and dense abrasive article. Decreasing the burning temperature to 1200° C. or 1150° C. will result in an article having a somewhat less apparent density and one which is not quite so hard. The degree of pressure to which the abrasive composition is subjected during forming will also have some effect upon the density of the finished article but that effect will be much less than the effect of the burning temperature.

Another advantage of the porcelanic bonds of my invention is that it is possible to produce abrasive articles containing very large proportions of bond such as those specified in Examples III and IV. The use of such high percentages of a glass type bond would be impossible since the glass bond at its maturing temperature would swell and bloat excessively and produce a weak misshapen article. In commercial practice the use of glass bonds in amounts greater than about 25% is impractical for this reason. Furthermore, inasmuch as the bond in abrasive compositions made according to my invention is the continuous phase of the mixture the inevitable shrinkage which takes place during the curing on any ceramic object will take place evenly throughout abrasive articles made in accordance with my invention and warping of the articles will be minimized or prevented.

Where I have referred to "porisity" in this application and the appended claims I refer to a more or less open structure resulting from the presence of a communicating pore system throughout the article and not to a vesicular structure resulting from the presence of sealed gas blebs or bubbles enclosed in the mass. These gas blebs or bubbles are the result of an overfusion which causes the evolution of gas from the silicate materials in the composition.

Having thus described my invention I claim:

1. An abrasive article comprising diamond abrasive and a porcelanic bond therefor, the bond being porous and relatively hard.

2. An abrasive article comprising diamond abrasive and a porcelanic bond therefor, the bond being present in an amount greater than approximately 25%.

3. An abrasive article comprising diamond abrasive and a porcelanic bond therefor, the bond being present in such an amount as to form a continuous phase.

4. An abrasive article comprising diamond abrasive and a porcelanic bond therefor comprising the reaction products of clay, feldspar and an inert filler.

5. An abrasive article comprising diamond abrasive and a porcelanic bond therefor comprising the reaction products of clay, feldspar and an inert filler, the bond being present in an amount greater than approximately 25%.

6. An abrasive article consisting of abrasive containing diamond and a porcelanic bond therefor, the bond being present in the proportion of approximately 85% or more.

7. An abrasive article consisting of diamond abrasive and a porcelanic bond therefor comprising the reaction products of clay, feldspar and an inert filler, the bond being present in a proportion of at least approximately 85%.

HENRY R. HOUCHINS.